Patented Sept. 26, 1944

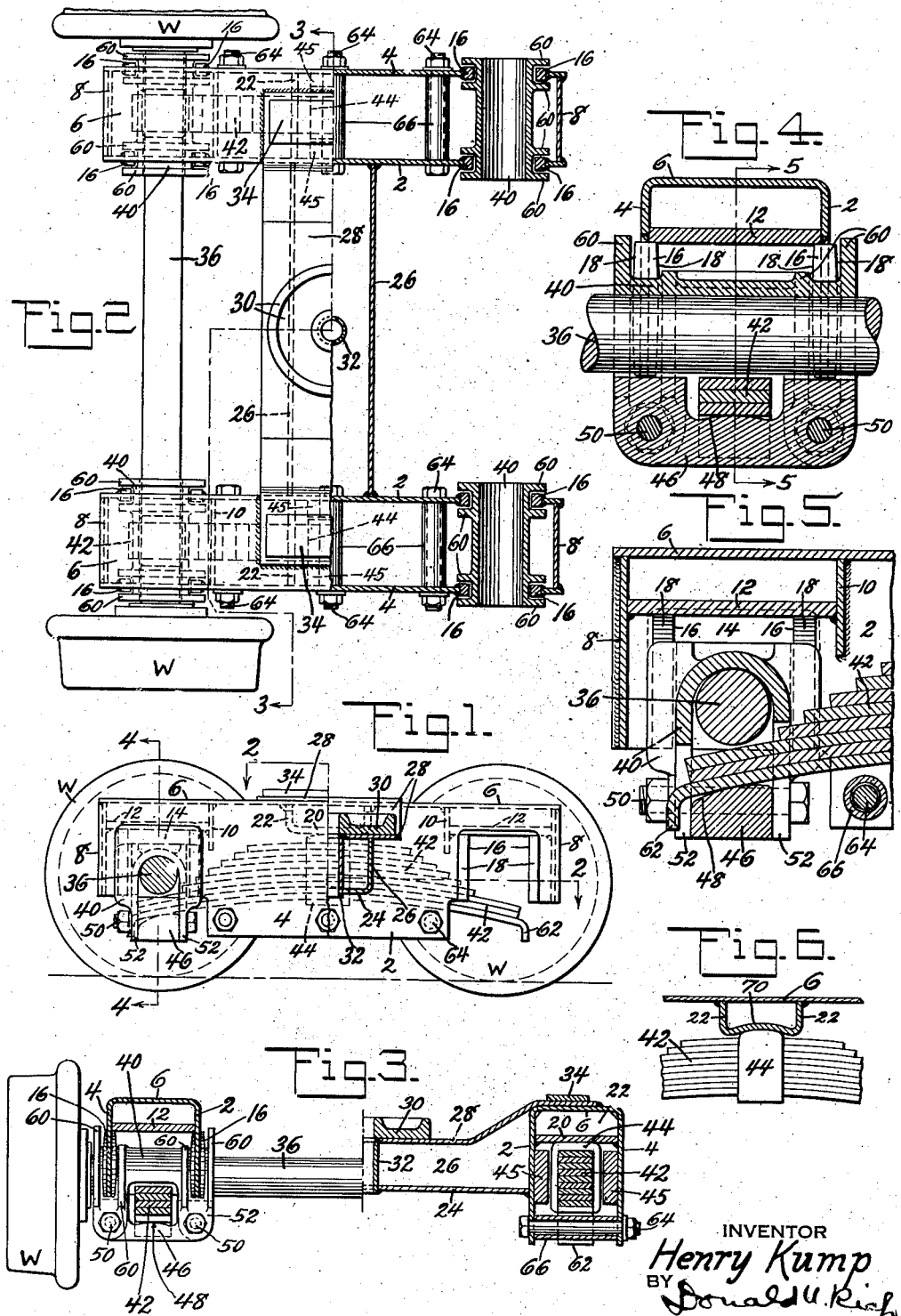

2,359,225

UNITED STATES PATENT OFFICE 2,359,225

CAR TRUCK

Henry Kump, Berwick, Pa., assignor to American Car and Foundry Company, New York, N. Y., a corporation of New Jersey Application March 7, 1942, Serial No. 433,693

6 Claims. (Cl. 105—194)

This invention relates to trucks in general and in particular to flexible trucks for use under mine or other industrial cars which must travel over irregular road beds.

In order to maintain production in mines it has been necessary to constantly increase the capacity of the cars as the length of haulage increased with development of the mine. A large percentage of the mines have now reached the point where the irregular road bed will not permit of increased car capacity while still using cars of the four wheel type. Accordingly, it has been necessary to go to an eight wheel car necessitating the use of trucks in order that the car may negotiate the curves in the mine trackage. It is impossible to use the ordinary type of railway car truck for these cars since such trucks are not flexible enough to remain on the rails in mines where the trackage is always extremely rough and irregular. Due to the irregularities and roughness of mine trackage the trucks are submitted to excessive shocks and must be very strong but must at the same time be extremely flexible, as otherwise they cannot follow the rail irregularities. It is an object, therefore, of the present invention to provide an extremely rigid truck frame for guiding the wheel and axle movements while positively controlling such movements.

A further object of the invention is the provision of a car truck for guiding the wheel and axle movements with the entire truck frame mounted on the wheels and axles through resilient equalizers.

A still further object of the invention is the provision of a rigid car truck frame having pedestal guide surfaces allowing rocking of the wheels and axles in vertical planes extending transversely of the truck.

A yet further object of the invention is the provision of a truck adapted to support the car body through the medium of resilient equalizers mounted to have limited universal movement relative to the axles.

These and other objects of the invention will be apparent to persons skilled in the art from a study of the following description and accompanying drawing, in which Fig. 1 is a side view of the improved truck with parts broken away to better disclose the construction;

Fig. 2 is a plan view partly in section taken on line 2—2 of Fig. 1;

Fig. 3 is a sectional view taken substantially on line 3—3 of Fig. 2;

Fig. 4 is a sectional view taken substantially on line 4—4 of Fig. 1;

Fig. 5 is a sectional view taken substantially on line 5—5 of Fig. 4, and

Fig. 6 is a detail view showing a slightly modified form of mounting the truck on the resilient equalizer.

Referring now to the drawing in detail it will be seen that the truck frame is formed by side pieces of inverted channel cross section having inner and outer downwardly directed flanges 2 and 4 respectively, joined together by web 6. End plates 8 are welded or otherwise secured to downwardly directed flanges 2 and 4 as well as to the web 6 of each side piece thus effectively tying the flanges of the side pieces together at their ends. Inwardly of the ends of the side pieces additional cross ties 10 are provided and these are welded or otherwise secured to the downwardly directed flanges and to the web of each side piece, as clearly shown in Fig. 5. The cross ties 8 and 10 as well as the side flanges 2 and 4 are additionally tied together by a substantially horizontal plate 12 welded to all of the parts immediately above openings 14 cut in the depending side flanges of the side pieces to accommodate the axle mounting hangers. The cut edges of flanges 2 and 4 have attached thereto vertically extending reinforcing and guiding bars 16. These bars are formed with curved sides 18, allowing movement of the axle mounting hangers without danger of binding. The curvature of the surfaces or sides 18 is such that they lie in a circle having a radius substantially equal to the distance to the remote wheel transversely of the truck. The side flanges 2 and 4 are additionally tied together and to the web 6 by a centrally located upwardly directed channel having web 20 and flanges 22 (Fig. 1). It will thus be seen that each side piece is extremely rigid with the bracing or tie members so located as to produce closed box sections immediately above the axles and at the central portion immediately above the center of the resilient equalizers later to be referred to. The truck side pieces are tied together by a closed box section cross tie formed by a channel having a web 24 and upwardly directed flanges 26, all of which are welded or otherwise secured to flanges 2 of the side pieces. The upwardly directed flanges are welded or otherwise secured to a top cover plate 28 which also overlaps and is welded or otherwise secured to the web 6 of the side pieces, thus a rigid closed box section cross tie is produced joining the side pieces together and forming a rigid truck of H formation. The load is transferred from the car body (not shown) to the truck frame through a center bearing 30 welded or otherwise secured to the top plate 28 of the cross tie. Aligned openings are cut in the cover plate 26 and in the web 24 and a tube 32 inserted and welded to the cover plate and web, thus forming an opening for reception of a center pin (not shown) by means of which the truck may be locked to the car body. Small wear pads or side bearing pads 34 are welded or otherwise secured to the ends of cover plate 28 immediately above the truck side pieces, as clearly shown in Figs. 2 and 3.

The rigid H form truck frame is resiliently supported upon the axles 36 carried by wheels W through the medium of bearing blocks or boxes 40 and semi-elliptic springs 42. The semi-elliptic springs fit within the truck side pieces and are held together by a central band 44, the upper surface of which is curved as shown in Figs. 1 and 6 and is adapted to bear upon the lower surface of web 20 of the central tie channel. The central bands fit between blocks 45 fastened to the side pieces and are thus held against lateral shifting. The ends of the semi-elliptic springs extend beneath the axles and rest upon a bearing pad 46 having a more or less spherically curved upper surface 48, as most clearly shown in Figs. 4 and 5. By use of this substantially spherically curved upper surface on the bearing pad substantially universal movement may be had between the semi-elliptic springs and the bearing pad. The bearing pads are hung on the axles by means of bolts 50 extending through the pads and through depending ears 52 formed on the axle hangers or boxes 40. As clearly shown in the drawings, the axle hangers or boxes bear directly on a considerable area of the axles which in the present instance do not turn since the bearings are located within the wheels. However, if the wheels are fixed upon the axles, then bearing brasses or other anti-frictional material would be interposed between the axles and the axle hangers or boxes 40. Each of the axle hangers or boxes is formed with ribs 60 located on either side of the bars 16 to the end that the hangers or boxes may be guided by the curved surfaces of the bars, thus in effect the bars cooperate with the axle hangers or boxes in much the same manner as do the pedestal jaws of the ordinary type of truck. It should be noted, however, that normally no load is carried by the ends of the truck side pieces since the entire load is transmitted through the semi-elliptic springs 42. Accidental disengagement of the semi-elliptic springs from the bearing pads is prevented by turning the ends of the lowermost spring leaf downwardly as at 62. Likewise the entire spring is held in the truck side pieces by means of bolts 64 extending through the flanges 2 and 4 of the side pieces and being tightly clamped on spacers 66. These bolts by being tightly clamped on the spacers not only act as limits or stops to prevent accidental removal of the springs but also serve as ties preventing any deflection of the truck side piece flanges 2 and 4.

In the form illustrated in Figs. 1 to 5 inclusive the spring central band 44 bears upon the flat web 20 of the central tie member. In certain cases it may be desirable to curve this bottom web of the central tie member as indicated by numeral 70 in Fig. 6.

From the preceding description it will be seen that an extremely rigid H form truck frame has been provided with the load carried directly from the center bearing to the side pieces and directly into the central portions of the semi-elliptic springs without in any way stressing the end portions of the side pieces. The truck frame may freely rock on the band 44 of the semi-elliptic springs and hence will have its position controlled only by the large center bearing 30 supporting the car body (not shown). Whenever any irregularity in the rails is encountered the wheels and axles may move to follow such irregularity, thus assuming a short rise in both rails both wheels on one axle would be lifted vertically with the shock absorbed and equalized by the springs which are free to rock about the center band 44. If, however, one wheel on an axle strikes a hump or depression in its rail, it may move upwardly or downwardly with the shock again absorbed by the semi-elliptic springs, such movement being permitted due to the spherically curved upper surface of pads 46 and the curved surfaces of pedestal forming bars 16. Thus the axles may move up and down in substantially vertical planes due to the special resilient equalizer and may oscillate in a vertical plane extending transversely of the truck due to the special shape of the bearing pads 46 and curved surfaces of the pedestal forming bars.

While the invention has been described more or less in detail it will be obvious that various modifications and rearrangements of parts may be made by persons skilled in the art and all such modifications and rearrangements of parts are contemplated as will fall within the scope of the appended claims defining my invention.

What is claimed is:

1. A vehicle truck comprising, a center bearing, a closed box section cross member supporting said center bearing, truck side pieces of inverted channel cross section rigidly secured to and closing the ends of said box-section cross member to form a rigid H-form truck frame, bearing boxes supported by wheels and axles adjacent the ends of the side pieces, guide pieces secured to the edges of openings formed in the flanges of the inverted channel side pieces adjacent their ends, pairs of spaced ribs formed on said bearing boxes and embracing said guide pieces whereby the guide pieces of both flanges of the inverted channel side pieces guide and control the relative vertical movements of said boxes and frame, resilient equalizer means located between and in spaced relation to the flanges of each of the inverted channel side pieces, said resilient equalizer means extending continuously from bearing box to bearing box and supported at their ends by said bearing boxes at a point beneath said axles, said resilient equalizer means being provided substantially at their center with means rockably supporting the truck frame thereon.

2. A vehicle truck comprising, a center bearing, a closed box-section cross member supporting said center bearing, truck side pieces of inverted channel cross section rigidly secured to and closing the ends of said box section cross member to form a rigid H-form truck frame, bearing boxes supported by wheels and axles adjacent the ends of the side pieces, guide pieces secured to the edges of openings formed in the flanges of the inverted channel side pieces adjacent their ends, pairs of spaced ribs formed on said bearing boxes and embracing said guide pieces whereby the guide pieces of both flanges of the inverted channel side pieces guide and control the relative vertical movements of said boxes and frame, resilient equalizer means located between and in spaced relation to the flanges of each of the inverted channel side pieces, said resilient equalizer means extending continuously from bearing box to bearing box and supported at their ends by said bearing boxes at a point beneath said axles, said resilient equalizer means being provided substantially at their center with means rockably supporting the truck frame thereon, and said guide pieces being formed with curved sides embraced by said pairs of spaced ribs whereby said wheels and axles may oscillate in the vertical planes of the axles.

3. A vehicle truck comprising, a center bearing, a closed box-section cross member supporting said center bearing, truck side pieces of inverted channel cross section rigidly secured to and closing the ends of said box-section cross member to form a rigid H-form truck frame, bearing boxes supported by wheels and axles adjacent the ends of the side pieces, guide pieces secured to the edges of openings formed in the flanges of the inverted channel side pieces adjacent their ends, pairs of spaced ribs formed on said bearing boxes and embracing said guide pieces whereby the guide pieces of both flanges of the inverted channel side pieces guide and control the relative vertical movements of said boxes and frame, resilient equalizer means located between and in spaced relation to the flanges of each of the inverted channel side pieces and spanning the distance between the bearing boxes of each side piece, bearing pads secured to the bearing boxes beneath the axles and formed with spherically curved upper surfaces adapted to slidably support the ends of said resilient equalizer means for limited relative universal movement, and a truck frame support located substantially at the center of each inverted channel side piece and rockably supporting the truck frame upon said resilient equalizer means.

4. A vehicle truck comprising, a center bearing, a cross member supporting said center bearing, truck side pieces of inverted channel cross section rigidly secured to the ends of said cross member to form a rigid H-form truck frame, bearing boxes supported by wheels and axles adjacent the ends of the side pieces, guide pieces secured to the edges of openings formed in the flanges of the inverted channel side pieces, spaced pairs of spaced ribs formed on said bearing boxes and embracing said guide pieces to control the relative vertical movements of said boxes and frame, resilient equalizer means located within each of the inverted channel side pieces and spanning the distance between the bearing boxes of each side piece, bearing pads secured to the bearing boxes beneath the axle and formed with spherically curved upper surfaces adapted to support the ends of said resilient equalizer means for limited relative universal movement, and a truck frame support located substantially at the center of each side piece and rockably supporting the truck frame upon said resilient equalizer means, said guide pieces each being formed with curved sides cooperating with said pairs of spaced ribs of the bearing boxes to permit oscillation of said wheels and axles in the vertical planes of the axles.

5. A vehicle truck comprising, a center bearing, a box section cross member supporting said center bearing, side pieces of inverted channel cross section rigidly secured to the ends of said box section cross member to form a rigid H-form truck frame, spaced guide pieces welded to the edges of openings in the flanges of said side pieces adjacent the ends thereof, bearing boxes supported by wheels and axles adjacent the guide pieces and being formed with spaced pairs of ribs embracing said guide pieces to control the movements of the boxes, a semi-elliptic spring unit located within each of the inverted channel side pieces in spaced relation to the flanges thereof and directly supported at its ends by the bearing boxes at a point beneath said axles, and means rockably supporting the central portion of each side piece upon substantially the center of the semi-elliptic spring unit carried therein.

6. A vehicle truck comprising, a center bearing, a box section cross member supporting said center bearing, side pieces of inverted channel cross section rigidly secured to the ends of said box section cross member to form a rigid H-form truck frame, spaced guide pieces secured to the edges of openings in the flanges of said inverted channel side pieces adjacent the ends thereof, bearing boxes supported by wheels and axles adjacent the guide pieces and being formed with spaced pairs of ribs embracing said guide pieces to control the movements of the boxes, a semi-elliptic spring located within each of the side pieces and supported at its ends by the bearing boxes at a point beneath said axles, and means rockably supporting the central portion of each side piece upon substantially the center of the semi-elliptic spring carried therein, said semi-elliptic spring being directly supported by the bearing boxes through the medium of substantially spherically curved surfaces located beneath the axle and said guide pieces having the sides embraced by said pairs of ribs curved whereby said wheels and axles may oscillate in the plane of the axles without binding said semi-elliptic springs.

HENRY KUMP.